United States Patent [19]

Innes

[11] 4,098,684

[45] Jul. 4, 1978

[54] PURIFICATION OF LIQUID N-PARAFFINS CONTAINING CARBONYL SULFIDE AND OTHER SULFUR COMPOUNDS

[75] Inventor: Robert A. Innes, Wilkins Township, Allegheny County, Pa.

[73] Assignee: Gulf Research & Development Company, Pittsburgh, Pa.

[21] Appl. No.: 745,631

[22] Filed: Nov. 29, 1976

[51] Int. Cl.² ............................................. C10G 25/00
[52] U.S. Cl. .............................. 208/245; 260/676 MS; 208/DIG. 2
[58] Field of Search ....................... 208/226, 230, 245; 260/676 MS

[56] References Cited

U.S. PATENT DOCUMENTS

| | | | |
|---|---|---|---|
| 3,051,646 | 8/1962 | Brooke | 208/245 |
| 3,096,569 | 6/1963 | Thomas | 208/245 |
| 3,211,644 | 10/1965 | Clark | 208/245 |
| 3,620,969 | 11/1971 | Turnock et al. | 208/245 |
| 3,654,144 | 4/1972 | Collins | 208/245 |

*Primary Examiner*—George Crasanakis

[57] ABSTRACT

COS and other sulfur compounds such as $H_2S$ or mercaptans are removed as impurities from liquid n-paraffin feedstocks by selective adsorption of the sulfur compounds using a dual bed of molecular sieves wherein the first bed contains the 13X variety sieves and the sequential bed contains a molecular sieve having an effective pore diameter of about 4 Å.

10 Claims, No Drawings

PURIFICATION OF LIQUID N-PARAFFINS CONTAINING CARBONYL SULFIDE AND OTHER SULFUR COMPOUNDS

The present invention relates to the desulfurization of liquid n-paraffin streams, and more particularly to the removal of COS and sulfur compounds such as $H_2S$ and ethyl mercaptan from said liquid n-paraffin containing feedstocks using a dual sequential bed of 13X molecular sieves followed by a bed of 4 Å molecular sieves.

The removal of carbonyl sulfide and sulfur compounds from paraffinic streams such as liquefied petroleum gases (LPG) or natural gasolines is desired for various reasons depending upon the final use of the product. LPG, for example, contains paraffins having from about 3 to about 5 carbon atoms per molecule, and this material or individual fractions thereof, is utilized in large volumes as domestic fuel, and the sulfur compounds are objectionable since they are corrosive and impart unpleasant odors to the fuel.

Carbonyl sulfide is relatively unique among the sulfur compound impurities of paraffinic feedstocks because of its low boiling point ($-50°$ C.). COS may be introduced with the feedstock, or it may be formed in the treating process as a result of the molecular sieve catalyzed reaction of carbon dioxide with $H_2S$ or other sulfur compounds.

There has developed a body of prior art directed to desulfurizing various types of hydrocarbon streams with either large pore or small pore zeolitic molecular sieves wherein the hydrocarbon is present either in the vapor or liquid state. For example, U.S. Pat. No. 3,211,644 discloses that sulfur compounds can be removed from hydrocarbon streams by passing the hydrocarbons in the liquid state through a bed of molecular sieves having an effective pore size of at least 3.8 Angstrom units and sufficiently large to receive said sulfur containing compound. It is taught in U.S. Pat. No. 3,654,144 to Collins in Column 2, lines 1–6, that large pore zeolites generally have little capacity for COS with the result that COS appears in the effluent prematurely, i.e. before the bed achieves its capacity for the higher boiling sulfur compounds. According to the '144 patent, the 4 Å sieve is known for its capability of adsorbing COS from gaseous hydrocarbon streams, but the sodium zeolite A (4 Å sieve) has "no practical capacity for COS under dynamic liquid contacting conditions." (See Col. 2, lines 7–13.) Collins teaches in the '144 patent that a modified zeolite A will remove COS from a liquid hydrocarbon stream. The modified zeolite A is one whose pores have been enlarged by exchange of at least 20 percent of the sodium with a divalent ion such as calcium. Collins teaches in Column 3 of his patent that if the liquid feedstream contains in addition to COS a sulfur compound such as a mercaptan, then both sulfur impurities can be removed by passing the charge stock through a dual adsorbent bed system containing a large pored molecular sieve such as a 13X sieve and the modified zeolite A. The order in which the sour liquid hydrocarbon stream contacts the two zeolites is not critical, according to Collins, but he prefers the large pore sieve to be in the initial portion of the bed.

An improved process has now been found in accordance with the invention for the total desulfurization of a sour normal paraffin containing feedstock under liquid phase conditions when the feedstock contains COS and other sulfur compounds such as $H_2S$ or an alkyl mercaptan. The COS can be present initially in the feedstock or may be formed in situ during the process of this invention. The process of the invention comprises passing the sour n-paraffin containing feedstock (at least 10% n-paraffins) in the liquid phase through an adsorption zone containing two different adsorbent materials, the first portion of the zone containing an activated zeolitic molecular sieve having a pore diameter large enough to adsorb benzene and the second portion of the adsorption zone containing an activated zeolite A having an effective pore diameter of about 4 Å. The recovered product is substantially free of COS and other sulfur compounds.

Any paraffinic feedstock containing COS and at least one other sulfur containing compound can suitably be treated by the process of this invention so long as the feedstock contains at least 10% n-paraffins. The carbon atom range of the paraffins is not critical but suitably the paraffins are those having from 3 to 10 carbon atoms per molecule. The paraffinic feedstock can be a single n-paraffin such as propane, n-butane or n-pentane; or mixures of paraffins such as liquefied petroleum gases (LPG) or natural gasoline can be treated so long as these mixtures contain at least 10%, preferably at least 20%, more preferably at least about 50%, n-paraffins. The paraffinic feedstocks may also contain minor amounts of olefinic impurities on the order of ten percent or less.

The process of this invention is directed to the desulfurization of the above paraffinic feedstocks which contain COS and at least one sulfur compound selected from the group consisting of $H_2S$ and a sulfur compound having a critical dimension of greater than about 4.5 Å, such as alkyl mercaptans. The COS may be present in the feedstock initially or may be formed in situ during the process as a result of reaction of carbon dioxide (present as a result of regeneration) with $H_2S$ or other sulfur compounds in the feedstock. Typical sulfur compounds having a critical dimension above about 4.5 Å include alkyl mercaptans such as methyl mercaptan, ethyl mercaptan, n-propyl mercaptan, isopropyl mercaptan, n-butyl mercaptan and the isomeric forms of amyl mercaptan.

The process of this invention will efficiently handle feedstreams containing minute traces of sulfur on the order of $0.5 \times 10^{-4}$ weight percent up to those containing 2 weight percent sulfur compounds whether in the form of COS, $H_2S$ or sulfur compounds such as the mercaptans. Typically the feedstock contains from 2 to 200 ppm COS, more typically from 10 to 100 ppm COS. COS may also be produced in situ. The product is found to be substantially free of sulfur compounds of all types. In commercial operation it is often desirable to produce a product having less than 10, preferably less than 1 ppm by weight of sulfur compounds of any type.

The term "zeolite" in general refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si) = 2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of absorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Å units, whereas calcium zeolite A has an apparent pore size of about 5 Å units.

Type 13X sieves are employed in the first adsorbent bed. The general chemical formula for a molecular sieve composition known commercially as type 13X is:

$$0.83 \pm 0.05 \, Na_2O . 1.00 Al_2O_3 . 2.48 \pm 0.038 \, SiO_2$$

plus water of hydration. Type 13X has a cubic crystal structure which is characterized by a 3-dimensional network with mutually connected intra-crystalline voids accessible through pore openings which will admit molecules with critical dimensions up to 10 Å. The void volume is 51 volume percent of the zeolite, and all adsorption takes place in the crystalline voids.

The 13X sieve removes any $H_2S$ and mercaptans which are present in the charge stock and any water which may also be present in the feedstock. COS present in the feedstock may also be adsorbed by the 13X sieve, but it has been found that the capacity for COS adsorption is small. Thus, as noted above, before the capacity of the 13X sieve is satisfied with respect to the mercaptan, COS appears in the effluent stream from the 13X bed.

The partially purified paraffin feedstock then passes through a second bed of a zeolitic molecular sieve of the zeolite A type having an effective pore size of about 4 Å. By "an effective pore size of about 4 Å" is meant a pore size which will substantially exclude propane from entering the pore but allow the entry of COS.

Zeolite A is a crystalline zeolitic molecular sieve which may be represented by the formula:

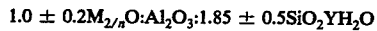

$$1.0 \pm 0.2 M_{2/n}O : Al_2O_3 : 1.85 \pm 0.5 SiO_2 Y H_2O$$

where M represents a metal, $n$ is the valence of M, and Y may have any value up to about 6. The as-synthesized zeolite A contains primarily sodium ions and is designated sodium zeolite A. All of the monovalent cation forms of zeolite A have an effective pore size of about 4 Å, excepting the potassium form which has a pore size of about 3 Å and consequently is unsuitable for use in the present invention. Zeolite A is described in more detail in U.S. Pat. No. 2,822,243 issued Apr. 14, 1959 to R. M. Milton. The preferred zeolite A is the so-called commercially available "4 A" sieve, i.e., sodium zeolite A.

Normally in operation, the liquid paraffinic feedstock containing the sulfur impurities is passed through an adsorption zone containing two dissimilar molecular sieve beds in series. Normally the adsorption zone is completely filled with liquid during the adsorption process. The flow rate should be such that the liquid hourly space velocity of the feedstock through the adsorption zone is from 0.1 to 10 v/v/hr and is preferably from 0.5 to 5 v/v/hr.

Preferably the liquid n-paraffin-containing feedstocks are contacted with the zeolitic molecular sieves at ambient temperature, although the particular temperature employed is not critical. The choice of the optimum temperature to employ depends on an economic balance between the savings in zeolitic molecular sieve material by virtue of higher adsorption capacities at lower temperatures and the cost of heat exchangers to obtain the lower temperature. With regard to feed pressure, the only limitation in this respect is that the pressure be sufficiently high to maintain the feed in liquid phase throughout the adsorption zone to avoid internal flashing with consequent poor contact with the molecular sieves and attrition of particles. As noted above, the process will efficiently handle feedstreams containing minute traces of sulfur up to those containing about two weight percent sulfur compounds. The process, however, is particularly advantageous in the removal of sulfur trace concentrations.

The adsorption step may be continued until the sulfur compounds, either COS, $H_2S$ or mercaptan, appear in the product, indicating that the capacity of the molecular sieve beds has been exceeded. Anyone with ordinary skill in the art can very simply ascertain for any given feedstock containing known amounts of COS and other impurities the relative size of the 13X and 4 Å beds required.

In the desorption or regeneration of the zeolitic molecular sieve beds, a hot, substantially non-adsorbable purge gas is passed through the beds at a temperature preferably between 350° and 600° F. (177° and 316° C.). The purge gas must also, of course, be non-reactive with respect to sulfur. Suitable purge gases include natural gas, methane, hydrogen, nitrogen and carbon monoxide. These desorption gases have molecular dimensions sufficiently small to pass through the pores of either the 13X or the 4 Å molecular sieves and thus be adsorbed therein; but their respective boiling points are sufficiently low so that the attractive forces between the pore walls in the molecules are small enough to prevent substantial adsorption. Desorption or regeneration can occur at elevated pressures of about 50 to 200 psig (0.34 to 1.4 MPa), and the rate of flow of a purge gas is correlated with the timing of the adsorption cycle so that while adsorption in one set of beds is completed, the second set of beds is being regenerated for reuse. The desorption time cycle must take into account a time period for cooling since desorption occurs at a much higher temperature than the adsorption cycle. Normally a time period of about four hours is sufficient to result in cooling of the molecular sieve bed. After cooling of the molecular sieve bed by non-passage of a desorption gas therethrough, a sufficient time on the order of about one hour is required to fill the zeolitic molecular sieve beds with a treated product from the on-stream unit. This treated product further helps to cool the unit.

The invention will be further described with reference to the following experimental work.

In a first series of runs, n-pentane was blended with Matheson CP Grade carbonyl sulfide and Baker ethyl mercaptan in concentrations of 100 and 800 ppm by weight, respectively, to form the feedstock. The n-pentane containing the COS and/or ethyl mercaptan was charged upflow through a bed of (1) Linde 13X molecular sieves; (2) Davison Grade 516 sieves (effective pore size 4 Å); (3) Davison Grade 522 zeolitic molecular sieves (effective pore size 5 Å); or (4) a bed consisting of 13X sieves followed by a bed of 4 Å sieves wherein equal volumes of the sieves were employed. In the mixed bed of sieves, the 13X sieves were separated from the 4 Å sieves by a wire mesh screen. Before initiation of the run, the absorbent was activated by flowing dry nitrogen through the bed at 600° F. (316° C.) for 16 hours. In all of the first series of runs, the n-pentane was passed upflow through the bed at a liquid hourly space velocity of 2; a temperature of 82° F. (27.8° C.) and atmospheric pressure.

The carbonyl sulfide in the product was determined by infrared spectroscopy using a Model 247 Perkin-Elmer dual beam infrared spectrophotometer, which compared the reactor effluent to a sample of pure n-pentane. COS was found to give a strong peak at 2045 $cm^{-1}$. With cells having a path length of 1.0 mm, the limit of detection was 2.0 weight ppm for COS.

Ethyl mercaptan in the product was determined by flame ionization gas chromatography where the limit of detection for mercaptan was 3.0 weight ppm. Solely to provide a basis for comparison of the various zeolitic molecular sieve adsorbents employed, breakthrough is said to have occurred when the concentration of either COS or ethyl mercaptan in the product exceeded 20 weight ppm. In commercial operation it is often desirable to produce a product having less than 1 ppm by weight COS. The results of the first series of runs are shown on Table 1 below.

Referring to Table 1 above, the breakthrough capacities for COS and ethyl mercaptan on 13X sieves were respectively 1.2 and 66 mg/g (see Exs. 1 and 2). It is apparent that COS is weakly absorbed on 13X sieves and can be displaced by n-pentane, while ethyl mercaptan is more strongly held. When a mixed feed of 800 ppm ethyl mercaptan and 100 ppm COS was employed (see Ex. 3), the breakthrough capacity for COS was again on the same order of magnitude, i.e. 1.4 milligrams per gram.

When the same charge stock as used in Example 3 was passed through a bed of the 5 Å molecular sieve, the capacity for COS was even further reduced to 0.7 mg/g (see Ex. 4), which is just about half of the capacity of the 13X sieve.

When 4 Å molecular sieves were used as the adsorbent, the breakthrough capacity for ethyl mercaptan was 43 mg/g (see Ex. 5) and the COS breakthrough capacity, surprisingly and unexpectedly, increased to 8.0 mg/g. It is apparent from the data in Table 1 that the capacity of the 4 Å sieves for COS is more than 10 times the capacity of the 5 Å sieves for COS, and is about 7 times the capacity of 13X sieves for COS. While not wishing to be bound by any particular theory, it is believed that the normal pentane is able to enter the cage structure of the 13X and 5 Å molecular sieves and thus tends to displace the weakly held COS, whereas n-pentane is excluded from the 4 Å sieve and thus is not available for displacing the COS. Perhaps the most surprising feature, however, is the fact that the COS is able to enter the 4 Å sieve from the liquid phase since the liquid phase material does not itself enter into the pores of the sieve because of size limitations. In Example 7 in Table 1 above, a bed of sieves consisting of 50 volume percent 13X sieves in the initial portion and 50 volume percent 4 Å sieves in the lower portion was employed for the treatment of the feedstream containing 800 ppm by weight of the ethyl mercaptan and 100 ppm by weight of the carbonyl sulfide. Because of the relative volumetric sizes of the sieve beds and the amount of COS and ethyl mercaptan in the feed, the COS breakthrough occurred first, but the breakthrough capacity was considerably higher than the breakthrough capacity using 13X sieves alone.

A second series of runs was made wherein the reactor was charged with about 15 volume percent 4 Å sieves and 85 volume percent 13X sieves. The 4 Å sieves were placed at the bottom of the reactor and a metal screen separated the sieve beds. Before use the sieves were dreid with nitrogen at 500° F. (260° C.) for 2 hours and then cooled with dry, sweet propane. Propane feed mixtures were made containing 100 ppm COS and 900 to 1350 ppm methyl mercaptan. The feed was passed downflow through the sieve bed at 170 psig (1.2 MPa) and ambient temperature at a liquid hourly space velocity of about 1. The sulfur content of the effluent was monitored continuously with a Houston-Atlas sulfur analyzer. As with the first series of runs, sulfur breakthrough was arbitrarily assumed when the effluent sulfur content reached either 20 or 30 ppm. At breakthrough, samples were taken for sulfur compound identification by flame photometry. Because of the relative concentration of the two sulfur compounds in the feed and their adsorption capacities on the sieve beds, COS

TABLE 1

COS AND ETHYL MERCAPTAN ADSORPTION ON MOLECULAR SIEVES

Feed: N-pentane plus COS and/or $C_2H_5SH$ in indicated amounts
Conditions: LHSV = 2.0; 820° F. (438° C.);
Atmospheric pressure

| Ex. No. | Adsorbent[2] | Feed, Wt. Ppm | | Breakthrough[1] Time, Hours | | Breakthrough[1] Capacity, mg/g | |
|---|---|---|---|---|---|---|---|
| | | $C_2H_5SH$ | COS | $C_2H_5SH$ | COS | $C_2H_5SH$ | COS |
| 1 | 13X | 800 | 0 | 50 | — | 66 | — |
| 2 | 13X | 0 | 100 | — | 7.5 | — | 1.2 |
| 3 | 13X | 800 | 100 | — | 8.4 | — | 1.4 |
| 4 | 5 Å | 800 | 100 | — | 4.2 | — | 0.7 |
| 5 | 4 Å | 800 | 0 | 30 | — | 43 | — |
| 6 | 4 Å | 0 | 100 | — | 45 | — | 8.0 |
| 7 | 50% 13X + 50% 4 Å | 800 | 100 | — | 30 | — | 5.3 |

[1]Breakthrough means either COS or $C_2H_5SH$ exceeds 20 wt ppm.
[2]Adsorbent was 60-80 mesh.

was the first compound to break through in all cases. After breakthrough, the sieve bed was flushed with sweet propane and regenerated upflow with hot nitrogen.

The results are shown in Table 2 below.

TABLE 2

EXPERIMENTAL RESULTS

| Ex. No. | Sieve Bed Composition wt % | | Feed Composition: Liquid Propane with: (ppm, wt) | | Average Feed Rate g/hr[c] | Hours to Breakthrough | Breakthrough Composition: (ppm by wt) | Breakthrough Capacity: mg/COS/g Sieve | |
|---|---|---|---|---|---|---|---|---|---|
| | 13X | 4 Å | MeSH | COS | | | | Total Bed | 4 A Sieve[d] |
| 8 | 83.4 | 16.6[a] | 900 | 100 | 141.4 | 17 | COS-20 | 1.23 | 2.89 |
| 9 | 85.2 | 14.8[b] | 1350 | 100 | 153.9 | 14 | COS-20 | 1.1 | 2.25 |
| 10 | 100 | — | 1350 | 100 | 147.4 | 12 | COS-30 | .90 | — |

[a]Davison 514 4 Å beads, 8–12 mesh.
[b]Davison 614 4 Å beads (binder-less) 8–12 mesh
[c]155 g/hr - 1.1 LHSV
[d]Based on .9 mg COS adsorbed/g 13X sieve Referring to Table 2 above, Examples 8 and 9 indicate that the capacity of the bed is about 1.1 milligrams of COS per gram of sieves for the total bed, and based on the results of Example 10 using 13X sieves only, the capacity of the 4 Å sieve is about 2.6 (an average figure).

Resort may be had to such variations and modifications as fall within the spirit of the invention and the scope of the appended claims.

I claim:

1. A process for the removal of COS and at least one other sulfur containing compound from a paraffinic feedstock containing at least 10 percent n-paraffins and wherein COS is present in said feedstock initially or is formed during the process, which process comprises
   passing said feedstock in the liquid phase through an adsorption zone containing two different adsorbent materials, the first portion of the zone containing an activated zeolitic molecular sieve having a pore diameter large enough to adsorb benzene and the second portion of the adsorption zone containing an activated sodium zeolite A having an effective pore diameter of about 4 Å;
   and recovering from said adsorption zone a product substantially free of sulfur compounds.

2. A process according to claim 1 wherein the paraffinic feedstock contains at least 20% n-paraffins having from 3 to 10 carbon atoms per molecule.

3. A process according to claim 2 wherein the feedstock contains at least one n-paraffin having from 3 to 5 carbon atoms per molecule.

4. A process in accordance with claim 3 wherein said first portion of the zone contains a bed of a 13X molecular sieve.

5. A process in accordance with claim 4 wherein the feedstock is pentane.

6. A process in accordance with claim 4 wherein the feedstock is propane.

7. A process in accordance with claim 4 wherein the feedstock is a mixture of paraffins having from 3 to 5 carbon atoms per molecule.

8. A process in accordance with claim 3 wherein the COS is present initially in the feedstock.

9. A process according to claim 3 wherein the sulfur compounds consist of COS and at least one mercaptan.

10. A process according to claim 1 wherein (a) the feedstock is passed through said adsorption zone until breakthrough of sulfur compounds in the product exceeds a desired level;
   (b) regenerating said adsorbent materials in said adsorption zone following step (a); and
   (c) repeating the step (a) of passing said feedstock in the liquid phase through said adsorption zone after said regenerating step (b) has been completed.

* * * * *